(12) United States Patent
Kandoti et al.

(10) Patent No.: US 12,500,848 B2
(45) Date of Patent: Dec. 16, 2025

(54) SYSTEM AND METHOD FOR PAUSING PACKET EXCHANGE DURING ROAMING

(71) Applicant: ZEBRA TECHNOLOGIES CORPORATION, Lincolnshire, IL (US)

(72) Inventors: Surya Kantha Rao Kandoti, Bangalore (IN); Venkata Aneel Kumar Inuganti, Bangalore (IN); Darpan Majumder, Bangalore (IN); Mahesh Kumar Edar, Davenagere (IN); Naga Babu Parsi, Bangalore (IN); Mahendiran Balasubramaniyam, Erode (IN); HariPrasad Mosuru Chandrasekhar, Bangalore (IN); Phanindra Kumar Gollapudi, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 427 days.

(21) Appl. No.: 17/955,284

(22) Filed: Sep. 28, 2022

(65) Prior Publication Data
US 2024/0106762 A1 Mar. 28, 2024

(51) Int. Cl.
H04W 4/00 (2018.01)
H04L 43/106 (2022.01)
H04L 47/56 (2022.01)

(52) U.S. Cl.
CPC .......... H04L 47/564 (2013.01); H04L 43/106 (2013.01)

(58) Field of Classification Search
CPC ............... H04L 47/564; H04L 43/106; H04W 36/0085; H04W 24/10; H04W 36/08
See application file for complete search history.

(56) References Cited

U.S. PATENT DOCUMENTS

| | | | |
|---|---|---|---|
| 11,178,728 B1 * | 11/2021 | Gu | H04W 48/16 |
| 2002/0191562 A1 | 12/2002 | Kumaki et al. | |
| 2007/0147305 A1 | 6/2007 | Farley et al. | |
| 2009/0135794 A1 * | 5/2009 | Su | H04W 36/26 370/338 |
| 2013/0316686 A1 * | 11/2013 | Subbaramoo | H04W 8/22 455/418 |
| 2013/0316687 A1 * | 11/2013 | Subbaramoo | G06F 1/3246 455/418 |
| 2014/0064249 A1 | 3/2014 | Lee et al. | |

(Continued)

OTHER PUBLICATIONS

International Search Report and Written Opinion for International Application No. PCT/US2023/33131 mailed on Jan. 26, 2024.

*Primary Examiner* — Abdelnabi O Musa

(57) ABSTRACT

An example computing device includes: a wireless communications interface configured to connect to a network deployed by a plurality of access points; a controller for the wireless communications interface, the controller configured to: detect a roaming condition that initiates a roam from a home access point to a new access point; in response to the roaming condition, send a pause indicator to a second computing device, the pause indicator configured to cause the second computing device to pause a packet exchange with the computing device; roam to the new access point; and resume the packet exchange between the computing device and the second computing device via the new access point.

24 Claims, 7 Drawing Sheets

(56) References Cited

U.S. PATENT DOCUMENTS

| | | | |
|---|---|---|---|
| 2015/0201451 A1* | 7/2015 | Pazhyannur | H04W 76/22 |
| | | | 370/338 |
| 2016/0119827 A1 | 4/2016 | Dayanandan et al. | |
| 2016/0255549 A1* | 9/2016 | Lakhdhar | H04W 36/0094 |
| | | | 370/332 |
| 2017/0195908 A1 | 7/2017 | Lee et al. | |
| 2020/0008216 A1* | 1/2020 | Iyer | H04W 72/23 |
| 2020/0288297 A1* | 9/2020 | Li | H04W 40/244 |
| 2021/0227480 A1* | 7/2021 | Sridharan | H04W 76/14 |
| 2022/0095188 A1* | 3/2022 | Jiang | H04W 36/023 |
| 2022/0240077 A1* | 7/2022 | Nam | H04W 36/36 |
| 2022/0312538 A1* | 9/2022 | Zhang | H04W 68/005 |
| 2023/0014083 A1* | 1/2023 | Wei | H04W 36/08 |
| 2023/0105571 A1* | 4/2023 | Mohamed Kasim | H04W 24/10 |
| | | | 370/329 |
| 2023/0137891 A1* | 5/2023 | Babaei | H04W 24/08 |
| | | | 455/436 |

* cited by examiner

SYSTEM AND METHOD FOR PAUSING PACKET EXCHANGE DURING ROAMING

BACKGROUND

Wireless networks may be serviced by several access points to which devices can connect based on their location within the wireless network. As users of mobile devices move around, the mobile devices may scan for different access points to which to connect and roam to access points with better connections. However, while scanning and/or roaming to a new access point, the movement away from the home access point may disrupt transmission and cause data packets destined for the device to be lost.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
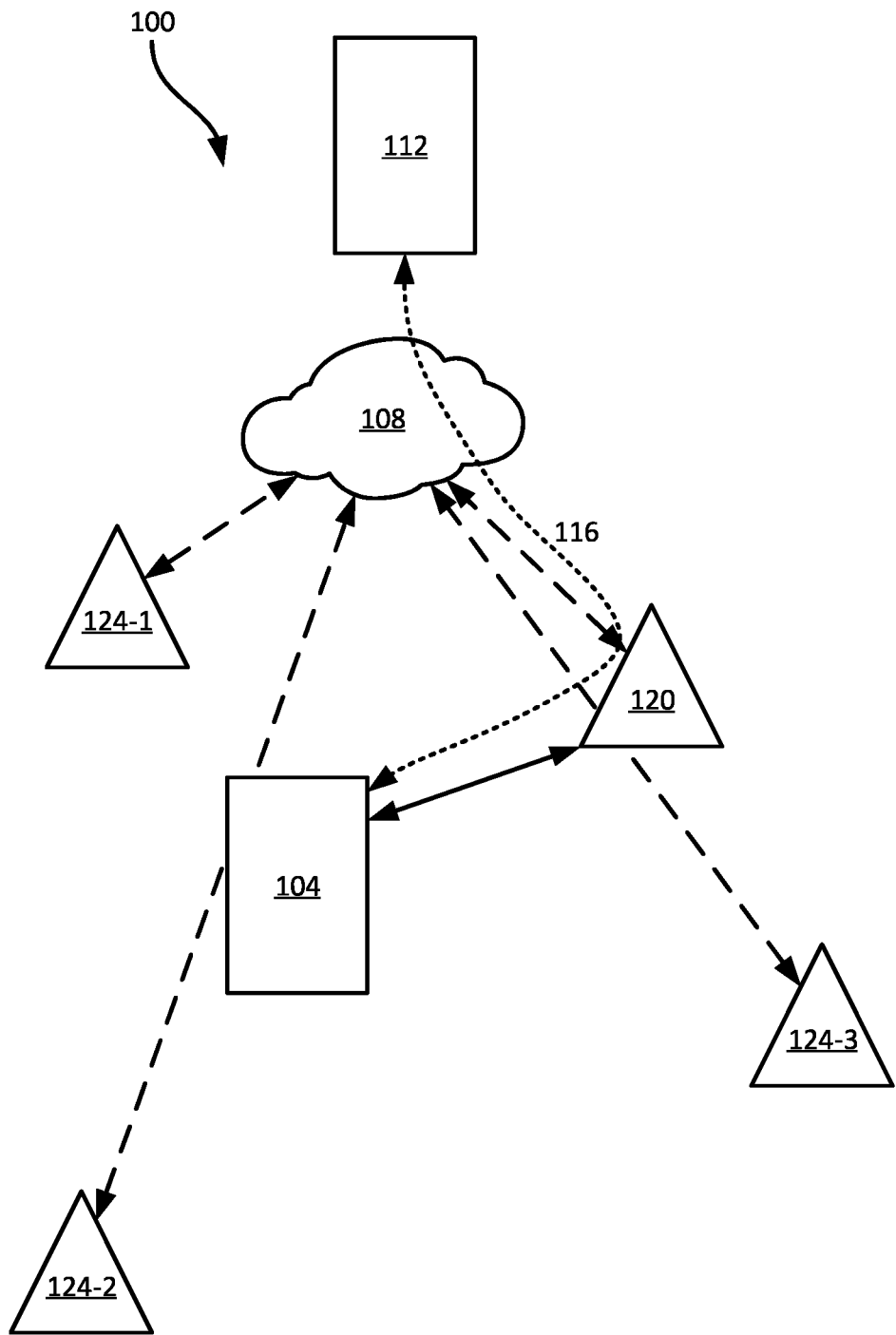
FIG. 1 is a schematic diagram of a system for pausing packet exchange during roaming.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device comprising: a wireless communications interface configured to connect to a network deployed by a plurality of access points; a controller for the wireless communications interface, the controller configured to: detect a roaming condition that initiates a roam from a home access point to a new access point; in response to the roaming condition, send a pause indicator to a second computing device, the pause indicator configured to cause the second computing device to pause a packet exchange with the computing device; roam to the new access point; and resume the packet exchange between the computing device and the second computing device via the new access point.

Additional examples disclosed herein are directed to another computing device comprising: a wireless communications interface configured to connect to a network deployed by one or more access points; a controller for the wireless communications interface, the controller configured to: during a packet exchange with a second computing device, receive a pause indicator from the second computing device; in response to receiving the pause indicator, pause the packet exchange between the computing device and the second computing device; in response to detecting a resume condition, resume the packet exchange with the second computing device.

Additional examples disclosed herein are directed to a method in a computing device, the method comprising: detecting a roaming condition that initiates a roam from a home access point to a new access point; in response to the roaming condition, sending a pause indicator to a second computing device, the pause indicator configured to cause the second computing device to pause a packet exchange with the computing device; roaming to the new access point; and resuming the packet exchange between the computing device and the second computing device via the new access point.

Additional examples disclosed herein are directed to a method in a computing device, the method comprising: during a packet exchange with a second computing device, receiving a pause indicator from the second computing device; in response to receiving the pause indicator, pausing the packet exchange with the second computing device; in response to detecting a resume condition, resuming the packet exchange between the computing device and the second computing device.

FIG. 1 depicts a system 100 for pausing packet exchange during roaming in accordance with the teachings of this disclosure. The system 100 includes a computing device 104 (also referred to herein as simply the device 104) connected to a network 108. The device 104 may communicate with a second computing device 112 via a link 116 which traverses the network 108. In some examples, the device 112 may be remote from the device 104 and the link 116 may therefore additionally traverse one or more wide-area networks such as the Internet, mobile networks and the like.

The device 104 may be a mobile computing device such as a handheld computer, a mobile phone, a tablet, a barcode scanner or the like. As noted above, the device 104 is connected to the network 108, which may be deployed for wireless communications within a facility, such as a transportations and logistics facility, a warehouse, retail establishment, or other facility. Accordingly, the network 108 may be a wireless local area network (WLAN) deployed by one or more access point. In the present example, four example access points, a home access point 120, and three foreign access points 124-1, 124-2, and 124-3 are depicted. In other examples, the network 108 may include more or fewer access points.

In particular, the device 104 may be currently serviced by the home access point 120 to connect to the network 108. Since the device 104 may be mobile, the device 104 may be carried about by a user. As the user of the device 104 moves about the facility or other region serviced by the network 108, the connection of the device 104 to the home access point 120 may weaken, and the device 104 may be better serviced by another foreign access point 124 of the network 108. Accordingly, the device 104 may roam to one of the foreign access points 124 to connect to the network 108, for example when the device 104 is out of range of the home access point 120 and/or when a better connection may be achieved via one of the foreign access points 124.

While the device 104 roams to another access point, such as the access point 124-1, packets sent by the device 112 destined for the device 104 may in some instances be lost or dropped. There may therefore be a decrease in call quality, for example, due to the lost packets while the device 104 is roaming. In accordance with the present disclosure, the roaming device 104 may send a pause indicator to the transmitting device 112 to indicate to the transmitting device 112 to pause packet exchange and buffer outgoing packets until a resume condition is reached. The resume condition may be the receipt of a resume indicator, or the expiry of a pause duration.

Figure 2:
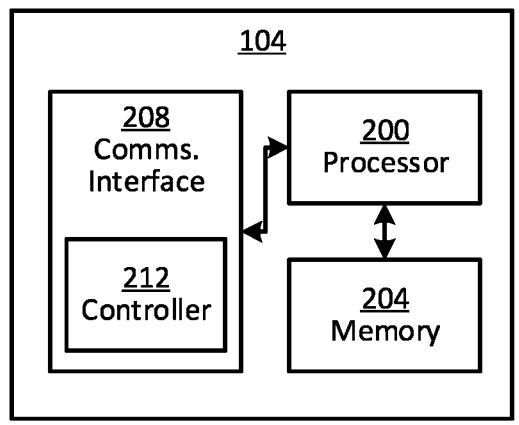
FIG. 2 is a block diagram of certain internal hardware components of the roaming device and the transmitting device of FIG. 1.
Figure 2:
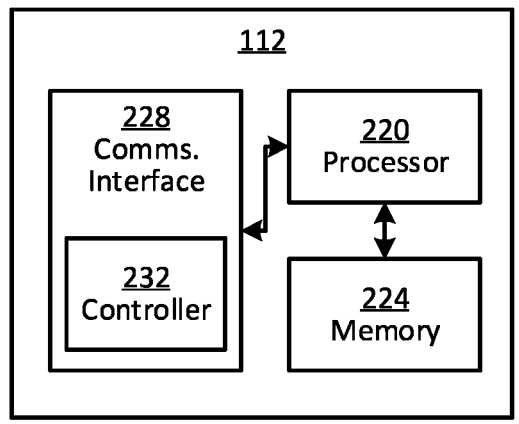

Turning now to FIG. 2, certain internal components of the computing devices 104 and 112 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits. The memory 204 stores computer-readable instructions for execution by the processor 200, including one or more applications which, when executed, configure the processor 200 to perform the various functions of the device 104.

The device 104 further includes a communications interface 208 enabling the device 104 to exchange data with other computing devices, such as the device 112. The communications interface 208 is interconnected with the processor 200. The communications interface 208 includes a controller 212, and one or more antennas, transmitters, receivers, or the like (not shown), to allow the device 104 to communicate with other computing devices such as the device 112 via the link 116.

The controller 212 may be a micro-controller, a microprocessor, or other suitable device capable of executing computer-readable instructions to control the components, such as the antennae, transmitters, receivers, and the like, of the communications interface 208 to perform the functionality described herein. The controller 212 may comprise one or more integrated circuits and may include and/or be interconnected with a non-transitory computer-readable storage medium storing computer-readable instructions which when executed configure the controller 212 and/or the communications interface 208 to perform the functionality described herein. In particular, the controller 212 may control an operation to pause packet exchange with the device 112 when the device 104 roams to a different access point.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

The device 112 is similar to the device 104 and includes a processor 220 interconnected with a non-transitory computer-readable storage medium, such as a memory 224. The device 112 further includes a communications interface 228 enabling the device 112 to exchange data with other computing devices, such as the device 104. The communications interface 208 includes a controller 232, and one or more antennas, transmitters, receivers, or the like (not shown), to allow the device 112 to communicate with other computing devices such as the device 104 via the link 116.

The controller 232 may be a micro-controller, a microprocessor, or other suitable device capable of executing computer-readable instructions to control the components, such as the antennae, transmitters, receivers, and the like, of the communications interface 208 to perform the functionality described herein. In particular, the controller 212 may control an operation to pause packet exchange with the device 104 when the device 104 roams to a different access point, as will be described further herein.

The device 112 may further include one or more input and/or output devices (not shown) suitable to allow an operator to interact with the device 112. The input devices may include one or more buttons, keypads, touch-sensitive display screens or the like for receiving input from an operator. The output devices may further include one or more display screens, sound generators, vibrators, or the like for providing output or feedback to an operator.

Figure 3:
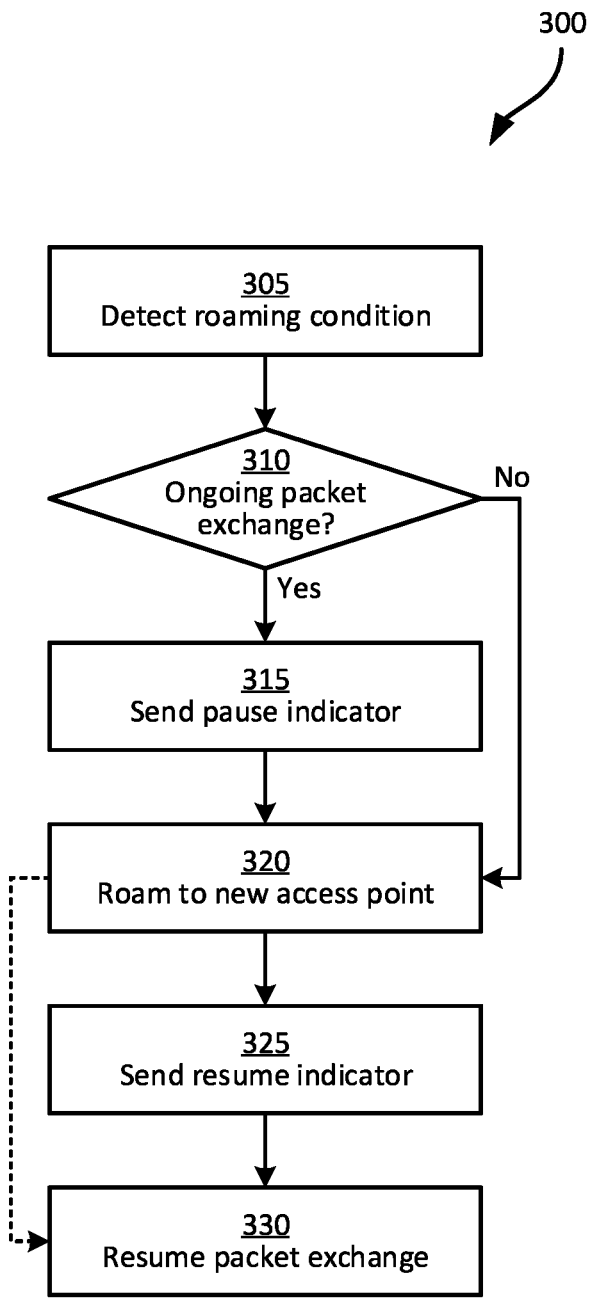
FIG. 3 is a flowchart of a method at a roaming device for pausing packet exchange during roaming.

FIG. 3 illustrates a method 300 of pausing packet exchange during roaming, from the perspective of the roaming device. The method 300 will be discussed in conjunction with its performance in the system 100, and particularly by the device 104. In particular, the method 300 will be described with reference to the components of FIGS. 1 and 2, as the device 104 interacts with the device 112. In other examples, the method 300 may be performed by other suitable devices and/or in other suitable systems.

The method 300 is initiated at block 305, where the device 104 may detect a roaming condition. For example, the roaming condition may be detecting that a signal strength to the home access point 120 is below a threshold strength, that a quality of service (e.g., as determined based on jitter, latency, etc.) is below a predetermined threshold or other similar conditions.

In other examples, the roaming condition may be the identification of a new access point (such as the access point 124-1) to roam to. For example, when the signal strength to a foreign access point 124 is above a threshold strength (e.g., different from the threshold strength for the home access point 120), or when a quality of service is above a different predetermined threshold, the device 104 may identify or select the foreign access point 124 as a target access point to which to roam, That is, the roaming condition may be detected after a roam scan is performed and the access point 124-1 is selected as a new access point to roam to. Other implementations of roaming conditions are also contemplated.

At block 310, the device 104 determines whether there is any active packet exchange ongoing with another device, such as the device 112. In some examples, the device 104 may particularly identify incoming transmissions from the device 112 acting as a transmitting device of those incoming packets, since the device 104 may readily be able to pause its own outgoing transmissions.

If the determination at block 310 is negative, that is there are no active packet exchanges, or more particularly, that there are no incoming transmissions from a transmitting device, then the device 104 may proceed to block 320 to roam to the new access point identified by the roaming condition at block 305.

If the determination at block 310 is affirmative, that is there are one or more active packet exchanges, or more particularly, that there are incoming transmissions from a transmitting device, such as the device 112, then the device 104 proceeds to block 315. At block 315, the device 104 sends a pause indicator to the transmitting device 112. The pause indicator is configured to cause the second computing device (i.e., the transmitting device 112) to pause a packet exchange with the device 104. The pause indicator may be a packet having a predefined message and/or configuration to indicate to the transmitting device 112 to pause the packet exchange with the device 104.

The pause indicator may include a time stamp indicating the time the pause indicator is sent by the device 104. This may allow the transmitting device 112 to determine whether or not the pause indicator is stale or still valid before pausing the packet exchange with the device 104. The pause indicator may additionally include a pause duration indicating a duration of time for which to pause the packet exchange. In some examples, the pause duration may be used in conjunction with the time stamp to determine whether the pause indicator is valid or stale, while in other examples, the validity of the pause indicator may be determined independently of the pause duration. Further, in some examples, the pause duration may be a predefined duration, and hence may not be included with the pause indicator.

At block 320, after sending the pause indicator to the transmitting device 112, the device 104 roams to the new access point 124-1 identified by the roaming condition at block 305.

At block 325, after roaming to the new access point 124-1, the device 104 may send a resume indicator to the transmitting device 112. In some examples, the resume indicator may be a dedicated packet with a predefined message and/or configuration to indicate to the transmitting device 112 to resume the packet exchange with the device 104. In other examples, for example, if the device 104 has outgoing packets to send to the transmitting device 112, the device 104 may simply send the outgoing packets as an indication that the device 104 has reconnected to the network 108 via the new access point 124-1, and that packet exchange may therefore resume.

In some examples, prior to sending the resume indicator, the device 104 may check whether packet exchange has already resumed. For example, if an incoming packet is received from the transmitting device 112, the device 104 may determine that the packet exchange has already resumed and/or that the packet exchange was not successfully paused. Accordingly, the device 104 may determine that no resume indicator is required and hence may suppress sending the resume indicator. The device 104 may then resume the packet exchange with the transmitting device 112. In other examples, the device 104 may determine whether the pause duration has expired. If the pause duration has already expired, the device 104 may determine that the transmitting device 112 may similarly determine that the pause duration has already expired and therefore resume the packet exchange without a resume indicator.

Accordingly, in some examples, the method 300 may proceed directly from block 320 to block 330. At block 330, the device 104 resumes regular packet exchange between the device 104 and the transmitting device 112 and may send and receive data packets as usual.

Figure 4:
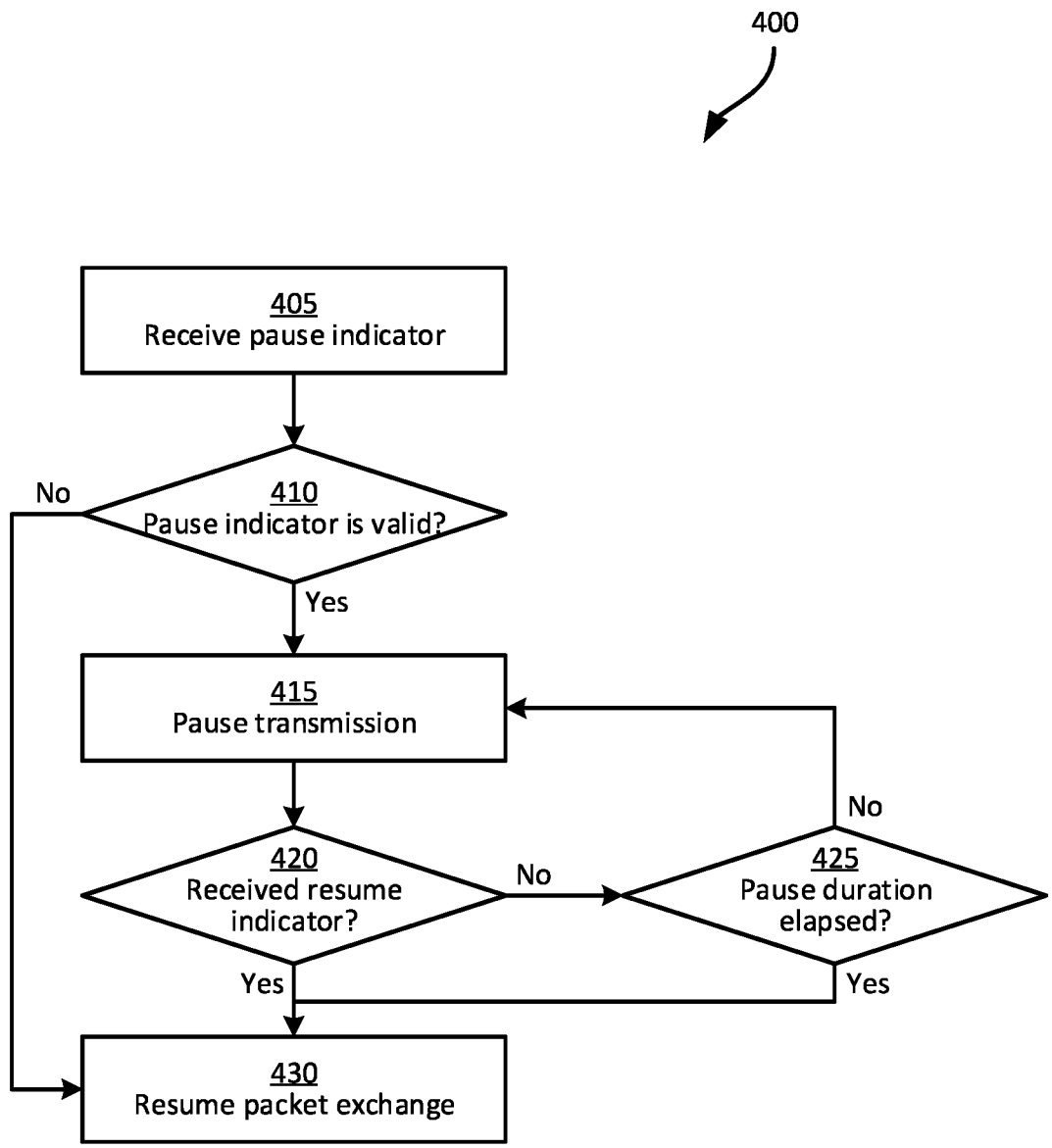
FIG. 4 is a flowchart of a method at a transmitting device for pausing packet exchange during roaming.

FIG. 4 illustrates a method 400 of pausing packet exchange during roaming, from the perspective of the transmitting device (i.e., the device transmitting to the roaming device). The method 400 will be discussed in conjunction with its performance in the system 100, and particularly by the device 112. In particular, the method 400 will be described with reference to the components of FIGS. 1 and 2. In other examples, the method 400 may be performed by other suitable devices.

The method 400 is initiated at block 405, which may occur while the device 112 is actively exchanging packets with the roaming device (e.g., the device 104). In particular, the device 112 may be actively in the process of transmitting packets to the device 104. At block 405, the device 112 receives a pause indicator from the roaming device 104, indicating to the device 112 that packet exchange should be paused.

At block 410, the device 112 processes the pause indicator to determine whether or not the pause indicator is still valid, or if it is stale. For example, the pause indicator may include a time stamp indicating the time the pause indicator was sent by the roaming device 104. The pause indicator may be valid for a given amount of time after it was sent, and accordingly, the device 112 may determine whether the given amount of time has passed since the time stamp on the pause indicator. For example, the given amount of time may be a predefined amount of time (e.g., 30 milliseconds) stored by the device 112. In other examples, the given amount of time may be a pause duration specified by the pause indicator.

If, at block 410, the device 112 determines that the pause indicator is stale, that is, that the given amount of time has already passed since the indicated time stamp on the pause indicator, then the device 112 may proceed directly to block 430.

If, at block 410, the device 112 determines that the pause indicator is still valid, that is, that the given amount of time has not yet passed since the indicated time stamp on the pause indicator, then the device 112 proceeds to block 415. At block 415, the device 112 pauses the packet exchange with the roaming device 104. In particular, the device 112 may buffer outgoing packets destined for the roaming device 104 to be sent once the packet exchange resumes. Further, the device 112 may initiate a timer for the pause duration specified by the pause indicator. The pause duration timer may be initiated from the time stamp specified by the pause indicator, or it may be initiated from the time or processing of the pause indicator.

At block 420, the device 112 determines whether it has received a resume indicator from the roaming device 104. In some examples, the resume indicator may be a dedicated packet with a predefined message and/or configuration to indicate that the device 112 may resume packet exchange with the device 104. In other examples, the resume indicator may be a regular incoming data packet from the roaming device 104. The device 112 may interpret an incoming packet from the device 104 as an indicator that the roaming device 104 has completed its roaming operation and is ready to resume packet exchange.

If at block 420, the device 112 has received a resume indicator from the roaming device 104, the device 112 proceeds to block 430 to resume packet exchange with the roaming device 104.

If at block 420, the device 112 has not received a resume indicator from the roaming device 104, then the device 112 proceeds to block 425. At block 425, the device 112 determines whether the pause duration has elapsed or expired. That is, in the case where a resume packet is never received, the device 112 may still have a resume condition by which to resume regular packet exchange, and will not buffer outgoing packets indefinitely.

Accordingly, if at block 425, the pause duration has not yet expired, the device 112 returns to block 415 to continue pausing packet exchange and buffering outgoing packets.

If at block 425, the pause duration has expired, the device 112 proceeds to block 430. At block 430, the device 112 resumes packet exchange with the roaming device 104. In particular, the device 112 may release the outgoing packets from its buffer for transmission to the roaming device 104.

Figure 5:
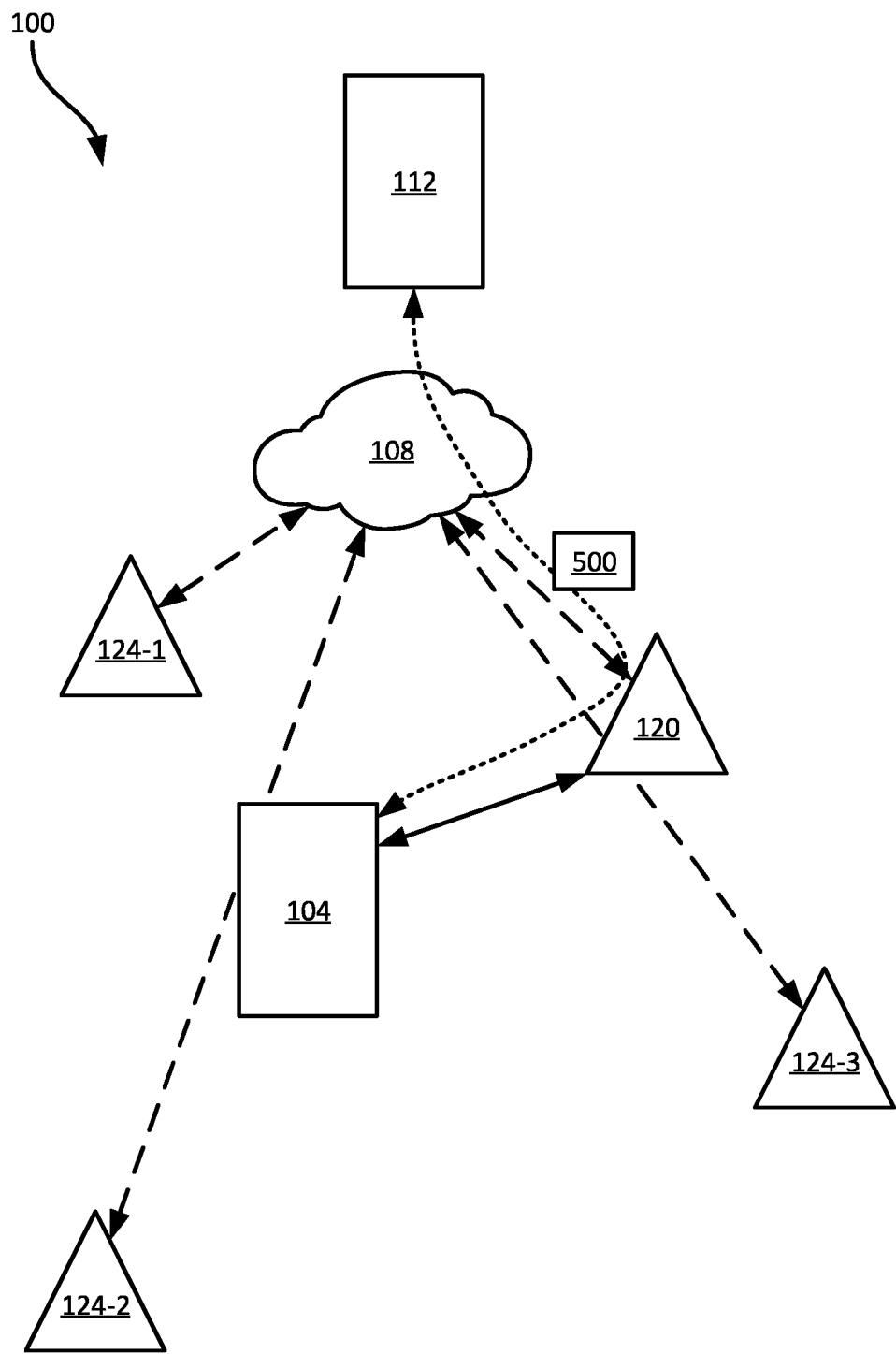
FIG. 5 is a schematic diagram of an example performance of blocks 315 and 405 of the methods of FIGS. 3 and 4.

Referring now to FIG. 5, a schematic diagram of the system 100 during the performance of block 315 of the method 300 and block 405 of the method 400 is depicted. In response to detecting a roaming condition by the device 104, such as the selection of the access point 124-1 as a new access point to roam to, the device 104 may send a pause indicator 500 to the device 112. Upon receiving the pause indicator 500, the device 112 may process the pause indicator 500 to determine whether or not it is still valid, and to initiate a timer to track a pause duration during which to buffer data packets destined for the device 104. For example, the device 112 may check the validity of the pause indicator 500 based on a time stamp of the pause indicator 500 and optionally additionally based on the pause duration specified by the pause indicator 500.

Figure 6:
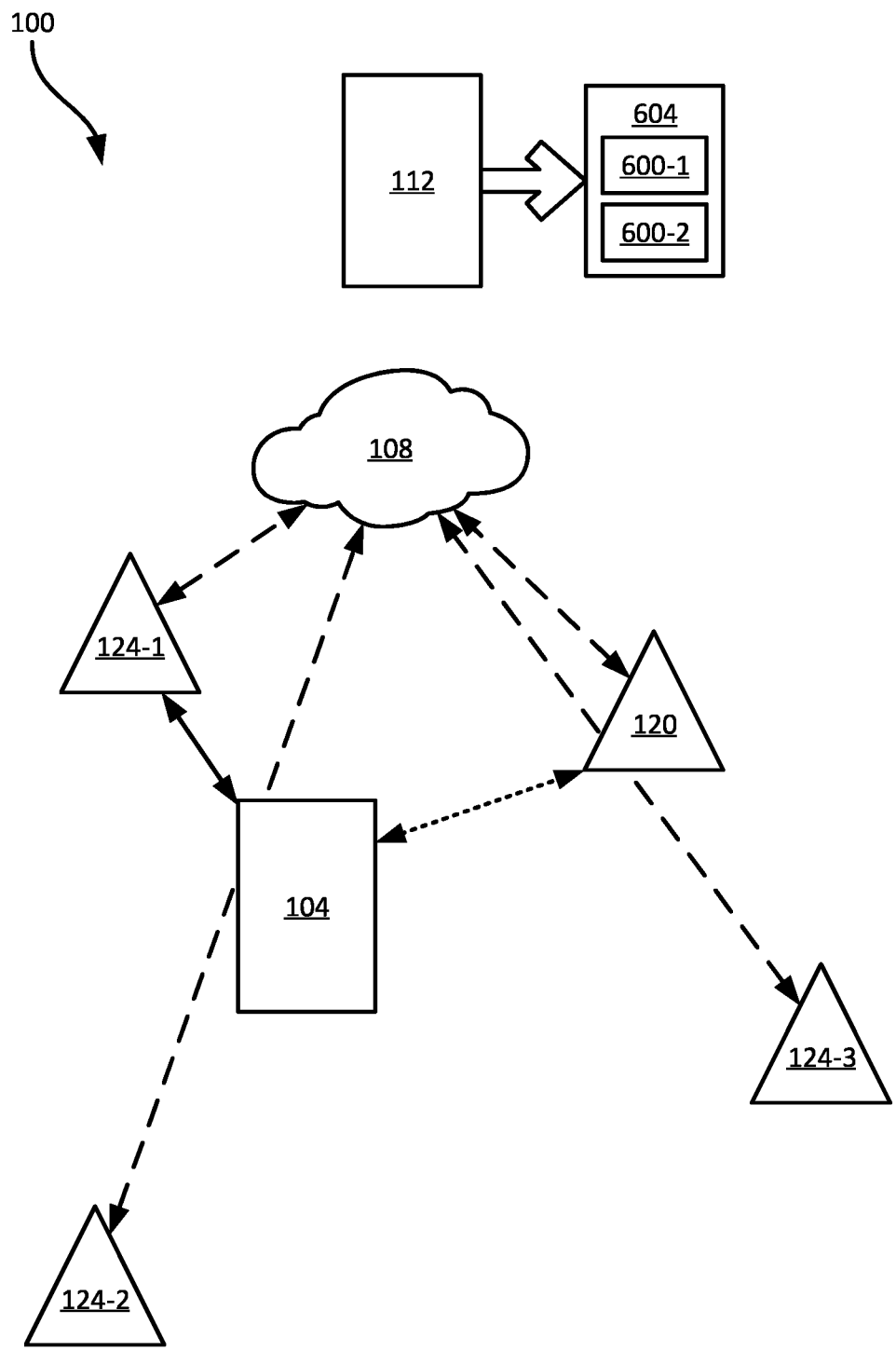
FIG. 6 is a schematic diagram of an example performance of blocks 320 and 415 of the methods of FIGS. 3 and 4.

FIG. 6 shows a schematic diagram of the system 100 during the performance of block 320 of the method 300 and block 415 of the method 400. In particular, the device 104 roams to the new access point 124-1 from the access point 120. While the device 104 is in the process of roaming, the device 112 may store data packets 600-1, 600-2 which are destined for the device 104 in a buffer 604 at the device 112.

Figure 7:
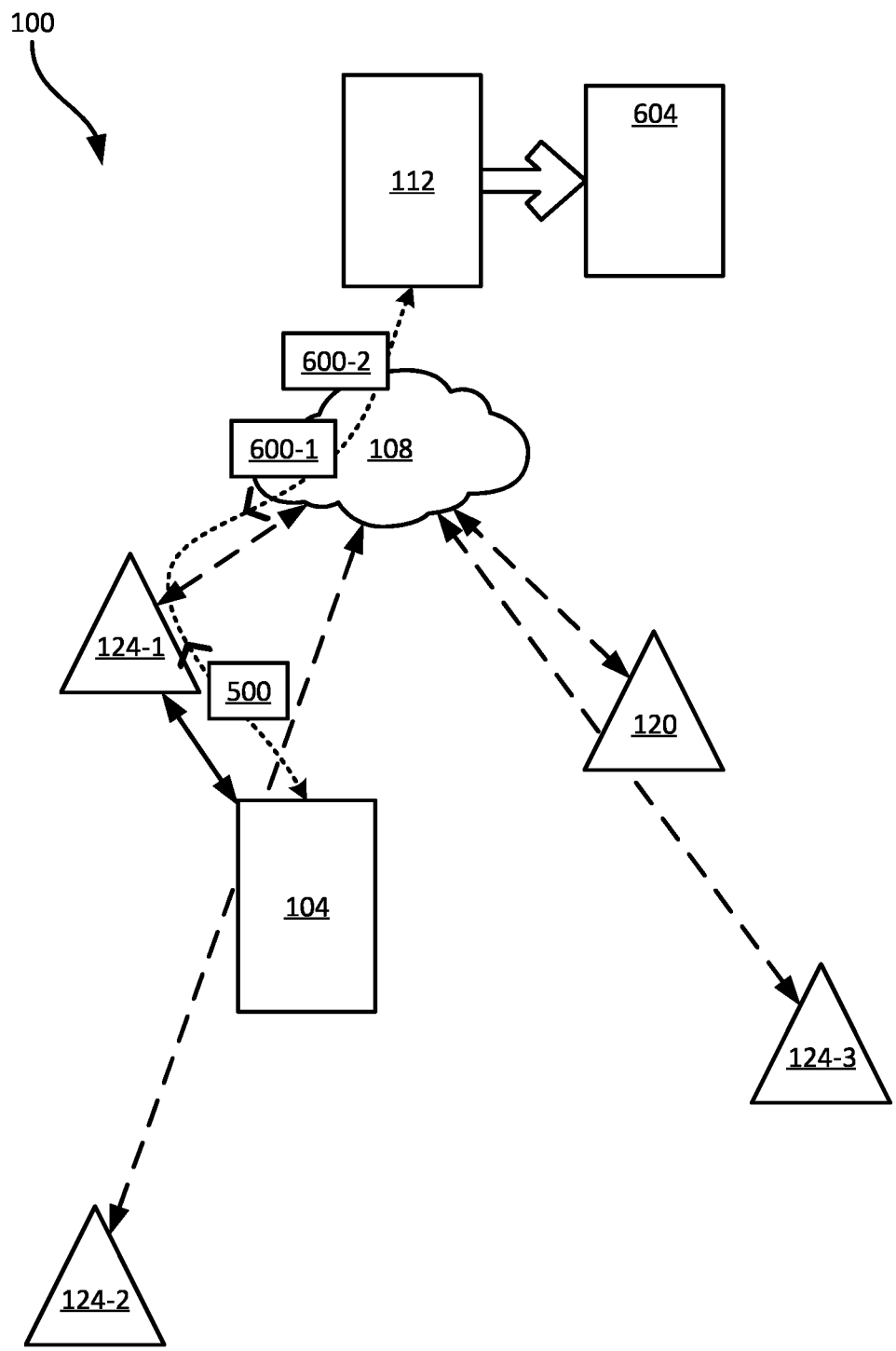
FIG. 7 is a schematic diagram of an example performance of blocks 325, 330, 420, and 430 of the methods of FIGS. 3 and 4.

FIG. 7 shows a schematic diagram of the system 100 during the performance of blocks 325 and 330 of the method 300 and blocks 420 and 430 of the method 400. In particular, upon roaming to the new access point 124-1, the device 104 may send a resume indicator 700 to the device 112. In response to receiving the resume indicator 700, the device 112 sends the buffered packets 600-1 and 600-2 from the buffer 604 to the device 104. That is, the packet exchange between the device 104 and the device 112 may resume, with the device 104 connecting to the network 108 via the access point 124-1 to enable the communication with the device 112. The device 104 may additionally begin sending packets destined for the device 112 via the access point 124-1. In other examples, the device 112 may send the buffered packets 600-1 and 600-2 from the buffer 604 when the pause duration expires rather than in response to the resume indicator 700.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:
   a wireless communications interface configured to connect to a network deployed by a plurality of access points;
   a controller for the wireless communications interface, the controller configured to:
      detect a roaming condition that initiates a roam from a home access point to a new access point;
      in response to the roaming condition, send a pause indicator to a second mobile computing device, the pause indicator configured to cause the second mobile computing device to pause a packet exchange with the mobile computing device;
      roam to the new access point; and
      resume the packet exchange between the mobile computing device and the second mobile computing device via the new access point.

2. The mobile computing device of claim 1, wherein
   the pause indicator comprises a time stamp indicating a time the pause indicator is sent by the mobile computing device.

3. The mobile computing device of claim 2, wherein
   the pause indicator further comprises a pause duration indicating a duration of time for which to pause the packet exchange.

4. The mobile computing device of claim 1, wherein
   the controller is further configured to, in response to roaming to the new access point, send a resume indicator to the second mobile computing device to resume the packet exchange with the second mobile computing device.

5. The mobile computing device of claim 4, wherein
   the controller is configured to, responsive to determining that an incoming packet is received from the second mobile computing device prior to sending the resume indicator, suppress sending of the resume indicator.

6. The mobile computing device of claim 1, wherein
   the controller is configured to, in response to roaming to the new access point, send a data packet to the second mobile computing device to continue the packet exchange.

7. A mobile computing device comprising:
   a wireless communications interface configured to connect to a network deployed by one or more access points;
   a controller for the wireless communications interface, the controller configured to:
      during a packet exchange with a second mobile computing device, receive a pause indicator from the second mobile computing device;
      in response to receiving the pause indicator, pause the packet exchange with the second mobile computing device; and
      in response to detecting a resume condition, resume the packet exchange between the mobile computing device and the second mobile computing device.

8. The mobile computing device of claim 7, wherein
   the pause indicator defines a pause duration for which the mobile computing device is to pause packet exchange with the second mobile computing device, and wherein the resume condition comprises an expiry of the pause duration.

9. The mobile computing device of claim 7, wherein
   the pause indicator comprises a time stamp indicating a time the pause indicator was sent by the second mobile computing device; and
   wherein the controller is further configured to:
      determine that the pause indicator is stale based on the time stamp; and
      when the pause indicator is stale, resume the packet exchange with the second mobile computing device.

10. The mobile computing device of claim 7, wherein
    the resume condition comprises receiving a resume indicator from the second mobile computing device.

11. The mobile computing device of claim 7, wherein
    the resume condition comprises receiving an incoming packet from the second mobile computing device.

12. The mobile computing device of claim 7, wherein, to pause the packet exchange with the second computing device, the controller is configured to buffer outgoing packets.

13. A method in a mobile computing device, the method comprising:
    detecting a roaming condition that initiates a roam from a home access point to a new access point;
    in response to the roaming condition, sending a pause indicator to a second mobile computing device, the pause indicator configured to cause the second computing device to pause a packet exchange with the mobile computing device;
    roaming to the new access point; and
    resuming the packet exchange between the mobile computing device and the second mobile computing device via the new access point.

14. The method of claim 13, wherein
    the pause indicator comprises a time stamp indicating a time the pause indicator is sent by the mobile computing device.

15. The method of claim 14, wherein
    the pause indicator further comprises a pause duration indicating a duration of time for which to pause the packet exchange.

16. The method of claim 13, further comprising,
    in response to roaming to the new access point, sending a resume indicator to the second mobile computing device to resume the packet exchange with the second mobile computing device.

17. The method of claim 16, further comprising,
    responsive to determining that an incoming packet is received from the second mobile computing device prior to sending the resume indicator, suppressing sending of the resume indicator.

18. The method of claim 13, further comprising,
    in response to roaming to the new access point, sending a data packet to the second mobile computing device to continue the packet exchange.

19. A method in a mobile computing device, the method comprising:
    during a packet exchange with a second mobile computing device, receiving a pause indicator from the second mobile computing device;
    in response to receiving the pause indicator, pausing the packet exchange with the second mobile computing device; and in response to detecting a resume condition, resuming the packet exchange between the mobile computing device and the second mobile computing device.

20. The method of claim 19, wherein the pause indicator defines a pause duration for which the mobile computing device is to pause packet exchange with the second mobile computing device, and wherein the resume condition comprises an expiry of the pause duration.

21. The method of claim 19, wherein the pause indicator comprises a time stamp indicating a time the pause indicator was sent by the second mobile computing device; and wherein method further comprises:

determining that the pause indicator is stale based on the time stamp; and when the pause indicator is stale, resuming the packet exchange with the second computing device.

22. The method of claim 19, wherein the resume condition comprises receiving a resume indicator from the second mobile computing device.

23. The method of claim 19, wherein the resume condition comprises receiving an incoming packet from the second mobile computing device.

24. The method of claim 19, wherein pausing the packet exchange with the second mobile computing device comprises buffering outgoing packets.

\* \* \* \* \*